Patented Aug. 27, 1946

UNITED STATES PATENT OFFICE 2,406,688

PROCESS FOR PRODUCING OLEFINIC HYDROCARBONS

Aaron W. Horton, Thorofare, and John Kellett, III, Woodbury, N. J., assignors to Socony-Vacuum Oil Company, Incorporated, a corporation of New York No Drawing. Application December 3, 1942, Serial No. 467,784

4 Claims. (Cl. 260—683.3)

This invention relates to the combined isomerization and dehydrogenation of aliphatic hydrocarbons of at least six carbon atoms having a quaternary carbon atom.

Processes are known for the preparation of quaternary carbon compounds, the art being developed along this line because of the interest in such compounds, for example, neohexane, as components of high octane gasoline. We have now found that these compounds may be readily converted to other hydrocarbons of great utility which are, in addition, valuable intermediates for preparation of a large number of desirable compounds. Neohexane is now less interesting as a motor fuel consttiuent than it once was in view of its drop in efficiency under conditions of heavy load and rich mixture. By means of our process, neohexane is converted to an intermediate in the synthesis of triptane, di-isopropyl, etc. The intermediate itself is an excellent blending agent for the production of aviation fuels.

Our invention is based on the discovery that when aliphatic hydrocarbons of at least six carbons containing a quaternary carbon atom are subjected to catalytic dehydrogenation, the molecule undergoes a characteristic isomerization resulting in two tertiary carbon atoms, one of which was quaternary and one secondary in the hydrocarbon charged. Preferably the catalyst is supported on a surface active carrier such as alumina, silica, carbon, natural or synthetic clays and the like.

The reaction proceeds in the manner indicated by the following equation for the conversion of neohexane:

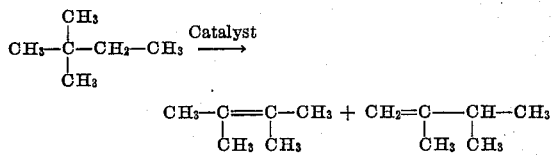

Maximum conversion by combined dehydrogenation and isomerization is obtained by passing the intial hydrocarbon in vapor phase over the catalyst at rates of 400 to 1500 volumes of vapor per volume of catalyst per hour. The yield is usually around 10 to 20% per pass, depending upon the conditions employed. Temperatures usual in dehydrogenation reactions are suitable and we have found that temperatures of 800 to 1200° F. give satisfactory conversions. Good conversions are obtained at various pressures and it is found advisable to use only such pressure as is necessary to give the desired pressure drop through the system including usual devices for separation and recycle of unconverted raw material. In general, pressures up to about 4 atmospheres are sufficient for that purpose.

Example I

Neohexane at 1000° F. and atmospheric pressure was passed through a vertical tube heated by an electric furnace and filled with a catalyst consisting of $Cr_2O_3$ supported on alumina at a rate of 950 volumes of vapor per volume of catalyst per hour. A 15% conversion to hexenes was obtained, of which 70% was found to be 2,3-dimethyl-butenes.

Example II

A second run similar to that of Example I, but at 980° F. using $Cu(CrO_2)_2$ on alumina as the catalyst resulted in a 14% yield of hexenes containing 70% of 2,3-dimethyl-butenes.

After a time, the catalyst becomes contaminated. It has been found that regeneration to substantially the same efficiency may be accomplished by oxidation with air at 750° to 950° F.

We claim:

1. A process for manufacturing 2,3-dimethylbutenes, which includes passing vapors of neohexane at temperatures varying between about 800° F. and about 1200° F., over a catalyst comprising chromium oxide, at rates varying between about 400 volumes of vapor per volume of catalyst per hour and about 1500 volumes of vapor per volume of catalyst per hour.

2. A process for manufacturing 2,3-dimethylbutenes, which includes passing vapors of neohexane at temperatures varying between about 800° F. and about 1200° F., over a catalyst comprising chromium oxide.

3. A process for producing olefinic hydrocarbons the molecules of which contain at least six carbon atoms and have two tertiary carbon atoms, which includes passing vapors of paraffinic hydrocarbons the molecules of which contain the same number of carbon atoms and have a quaternary carbon atom, at temperatures varying between about 800° F. and about 1200° F., over a catalyst comprising chromium oxide, at rates varying between about 400 volumes of vapor per volume of catalyst per hour and about 1500 volumes of vapor per volume of catalyst per hour.

4. A process for producing olefinic hydrocarbons the molecules of which contain at least six carbon atoms and have two tertiary carbon atoms, which includes passing vapors of paraffinic hydrocarbons the molecules of which contain the same number of carbon atoms and have a quaternary carbon atom, at temperatures varying between about 800° F. and about 1200° F., over a catalyst comprising chromium oxide.

AARON W. HORTON.
JOHN KELLETT, III.